United States Patent [19]
Matejka et al.

[11] Patent Number: 4,517,228
[45] Date of Patent: May 14, 1985

[54] PIGMENTED PREPRESS COATINGS FOR COMPOSITION BOARD

[75] Inventors: Robert C. Matejka; Nellie M. Moretz, both of High Point, N.C.

[73] Assignee: Reliance Universal, Inc., Louisville, Ky.

[21] Appl. No.: 564,732

[22] Filed: Dec. 23, 1983

[51] Int. Cl.³ .......................... B05D 1/18; B05D 3/12; B32B 3/26; B32B 31/00
[52] U.S. Cl. ..................... 427/370; 264/119; 264/134; 427/393; 427/440; 524/277; 524/451
[58] Field of Search ............... 428/156, 165, 171, 172, 428/511, 528; 264/109, 113, 119, 126, 134; 427/370, 393, 440; 524/277, 451

[56] References Cited
U.S. PATENT DOCUMENTS 3,098,785 7/1963 Meiler ............................... 162/56 X
4,201,802 5/1980 Vande Kieft .................. 264/119 X
4,237,087 12/1980 Jones ................................. 264/134
4,238,438 12/1980 Laughinghouse et al. ......... 264/119

Primary Examiner—Michael R. Lusignan
Attorney, Agent, or Firm—Donald L. Cox

[57] ABSTRACT

Disclosed herein is a process for coating a fiber mat with a pigmented coating prior to subjecting the mat to heat and pressure treatment to form a composition board having a smooth, embossed or textured surface. The coating contains a mixture of an acrylic, hydroxyl or carboxyl functional vehicle, a melamine-based coating crosslinking agent for the vehicle, a high-melting wax, and a platelet form of talc. By employing this process, composition board products are obtained which have superior surfaces and surface finishes. In addition, these finishes inhibit composition board extractive migration which causes the formation of discolored spots on the finished composition board's surface.

9 Claims, No Drawings

PIGMENTED PREPRESS COATINGS FOR COMPOSITION BOARD

BACKGROUND OF INVENTION

This invention relates to methods for preparing synthetic composition board. More particularly, this invention relates to a process for preparing wood composition board which involves applying a pigmented coating to the surface of a fibrous mat prior to subjecting the mat to a press treatment.

Several methods have been suggested for preparing synthetic fiberboards or hardboards which are based upon wood particle chips or other lignocellulose fibers. These products are generally prepared by forming a mat of the wood precursor and consolidating the mat into a board by the application of heat and pressure. One major problem in forming these products into a unitary mat has involved release of the densified wood composite from the hot press plates. Another major problem exists with wood composition products, in that extractives, such as wood tannin or sugars and synthetic waxes tend to migrate to the surface and form tacky spots on the exterior of the finished composition board. The tacky spots collect dirt and cause unsightly spotting.

U.S. Pat. No. 4,237,087 discloses a water-borne, base coat composition which facilitates the embossing of wood-based particle board. The coating composition contains an acrylic emulsion resin, a urea resin, and an acid catalyst. However, no disclosure is made of the use of platelet form talc.

U.S. Pat. No. 4,201,802 also discloses a composition for the surface sealing of hard board products. However, the coating composition employed in this patent is a polymer of polyvinyl alcohol employed in combination with a volatile amine, emulsified fatty acids or esters, and aluminum stearate. While the patent does disclose the use of talc as a general purpose inert pigment, it does not disclose the particular type of talc employed nor the benefits derived from its use.

Platey talc is a known pigment which is most often used in forming undercoatings for metals because it tends to improve sanding properties and water resistance. However, its use in pigmented prepress coatings has not been disclosed previously.

Accordingly, it is an object of this invention to prepare in-press pigmented coatings for composition board, which coatings exhibit a smooth, embossed or textured surface.

It is another object of this invention to prepare pigmented coatings which exhibit excellent press release properties.

It is still another object of this invention to prepare sealers which limit or eliminate the surface migration of wood tannin, sugars or low melting waxes with attendant discoloration, dirt attraction and spotting.

These and other objectives are obtained by employing the process of the instant invention.

SUMMARY OF INVENTION

Basically, the instant invention involves a conventional process for preparing composition board products which employs a unique step of applying to a composition mat of a density of less than 60 lbs per cubic foot prior to the application of heat and pressure, a coating composition comprising an hydroxyl or carboxylic acid-containing acrylic vehicle, a high-melting wax, a melamine-based crosslinker for the vehicle, and a platelet form of talc.

By applying this emulsion to the surface of the fibrous mat prior to the application of heat and pressure, it is possible to obtain a finished composition board product which does not upon exterior exposure exhibit surface spotting caused by wood tannin, sugars or wax migration. In addition, the coating compositions of the instant invention exhibit excellent press release properties which aid in the continuous removal of the composition board product from the mold after the repeated application of heat and pressure. In addition, the coating compositions of this invention do not carbonize even under the high surface pressures and temperatures employed in preparing composition board.

DETAILED DESCRIPTION OF INVENTION

The basic process for the preparation of composition board from wood-based products is well known and will only be discussed in a very summary fashion here. Generally, this process is disclosed in U.S. Pat. Nos. 3,098,785 and 4,238,438, which are incorporated herein by reference. As used herein, the phrase "composition board" includes the various hardboards, fiber boards, particle boards, wafer boards and strand boards, including, but not limited to, wet processed hardboards, dry processed hardboards, wet/dry processed hardboards, medium density fiber board, oriented strand board, and mende boards, to name but a few.

The general process involves using wood chips or particles which are steamed, converted to fibers, formed into a mat, and hot pressed to form a hard board or fiber board. Usually the wood particles are fed into a cooker and held under pressure of up to about 200 psi for less than about 10 minutes at temperatures ranging up to somewhat less than about 400° F. The steamed chips are then refined into fibers which are introduced into a felting zone, where a thermosetting glue and other additives, such as hydrophobic, low-melting waxes, are mixed with the fiber products. In most cases, the glue is a phenolformaldehyde resin which is added in the range of about 0.5 to about 10 percent, based on the weight of the dry fiber. The low-melting waxes are added at levels up to about 13%, based on the dry fiber.

After the glue has been mixed with fibers, the treated wet or dry mat is conveyed into a hot press where one or more than one high pressure, heat treatment is applied. In a typical operation, the mat is pressed for about 10 seconds at 400 psi, then for about 4 minutes at 150 psi and 450° F. In general, one or more than one high pressure treatment step may be employed with pressures ranging up to about 1200 psi and temperatures ranging from about 200 to about 600° F.

As recognized in the prior art, one of the major problems in preparing composition board products has resided in the high pressure, high temperature, time duration, press step. Another prior art problem was the so-called "press release" characteristics of the composition board. For example, in many of the prior art processes, fiberboard or hardboard tended to stick to the surface of press plates after pressing. Another problem with prior art products was the lack of density or surface hardness of the hard board. These deficiencies caused paint hold-out problems and poor exterior durability of the product. For example, in coating many prior art hardboards, the coating composition would be extensively absorbed into the hardboard itself, and as a result, large amounts of expensive coating compositions were required. In addition, the exterior exposure properties of untreated fiber board products were often unsatisfactory. Finally, certain prior art processes tended to contribute to carbonization buildup on the press plates, and in many cases after only several days' pressing, it was necessary to stop the processing operation and clean the plates.

As pointed out above, one of the major problems in prior art manufacture of composition board products was wood tannin, sugar, and wax bleed discoloration. In forming pressed board compositions, it is necessary to employ various low grade waxes, such as petroleum slack wax, in order to impart the desired degree of hydrophobic properties to the finished product. After preparation, however, these waxes often tend to leach to the surface and actually exude through any coating composition onto the finished surface. Because of the low melting point of these waxes, the migration causes the coated surface of the hardboard to become tacky in areas where the wax has migrated through to the surface. These tacky areas, in turn, pick up dirt from the atmosphere and cause a "spotting" of the hardboard surface. In a similar fashion, tannins and sugars often migrate to the surface of coated composition board products, causing objectionable surface discolorations.

In the instant invention the coating composition described hereafter reduces or eliminates surface spotting caused by wax, tannin or sugar migration. In addition, the coatings described hereafter possess excellent press release properties, exit from the press with uniform color, and greatly improve the paint hold-out characteristics of the finished composition board products.

The acrylic emulsion resin useful herein can be prepared by conventional emulsion process techniques, which involve the emulsion polymerization of various acrylic and other alpha beta ethylenically unsaturated monomers in the presence of free radical generating catalysts and various surfactants or emulsification agents. These processes and products are well known in the art and will not be described further. However, the preferred acrylic emulsions which are useful herein contain at least about 20 percent by weight of an alpha beta ethylenically unsaturated monomer based upon acrylic or methacrylic acid. Such monomers include predominantly the $C_1$–$C_8$ esters of these acids. In order to insure that the acrylic emulsions are subject to crosslinking using the crosslinking agents described hereafter, they should contain from about 1.0 to about 30 percent by weight of a carboxyl or hydroxyl functional monomer. Examples of the acid monomers include acrylic, methacrylic, ethacrylic, crotonic and itaconic acids, as well as various half acid esters or maleic and fumaric acids. The hydroxy monomers include the hydroxyalkyl acrylates and methacrylates predominantly. Also included are other acrylate-type monomers, including acrylonitrile and methacrylonitrile and other related materials. In order to increase the $T_g$ of the polymers prepared according to the instant invention, up to about 40 percent by weight of an alpha beta ethylenically unsaturated aromatic monomer copolymerizable with the aforementioned acrylate and methacrylate esters can be employed. Examples of such materials include styrene and vinyl toluene. Also included are up to about 60 percent by weight of another optional monomer copolymerizable with these first monomers.

The acrylic emulsion useful herein should have a viscosity of less than 2000 cps, preferably less than 1000 cps, at a solids content of about 40 to about 60 percent by weight. The preferred emulsions useful herein are the nonionic surfactant stabilized emulsions based upon, for example, the various polyethylene oxide and polypropylene oxide-based phenolic-type surfactants. However, the anionic and cationic surfactant stabilized emulsions may also be employed herein.

The second crucial element of the compositions of the instant invention is a melamine formaldehyde type crosslinking agent for the acrylic emulsion. The curing agent should be water-soluble or readily water-dispersible, with or without the use of a co-solvent, and is preferably a melamine-based crosslinking agent, although urea/formaldehyde-type curing agents may also be employed alone, or in combination with the melamine formaldehyde-type curing agents described hereafter. Basically, the crosslinking agents are preferably based upon polyalkoxymethylol melamine, with the hexamethoxymethylol melamines being most preferred.

The third crucial component of the compositions of the instant invention is a high-melting wax. Generally these waxes must have a softening point in the range of above about 140° F., preferably 150° F. Most preferred among these waxes are waxes of the carnauba, polyethylene polymekan, micro crystalline, and other similar types.

The final component of the compositions of the instant invention is a platelet, platey or micaceous form of talc. (Talc also occurs in these other forms: 1. fibrous or foliated; 2. acicular or tremolitic; and 3. nodular or steatite.) Generally, talc materials are of two types, either hydrous or anhydrous. Both are based upon magnesium silicate and may have the chemical formula $Mg_3Si_4O_{10}(OH)_2$ or $3MgO.4SiO_2.H_2O$. While either material may be used, the hydrated materials are most preferred. In either event, it is crucial that the talc compositions of the instant invention be of the platelet form. In other words, the material must form platelets which are wider and broader than they are thick. In general, it is preferred that the talc compositions of the instant invention have aspect ratios (average diameter/average thickness) of about 10:1 to 30:1, preferably about 15:1 to 25:1, and that they have diameters of about 1–4 micrometers and thicknesses of about 0.5 to about 0.05 micrometers., preferably diameters of about 2 micrometers and thicknesses of about 0.1 micrometers.

The compositions of the instant invention may also be compounded with pigments, fillers, reinforcing agents, thickeners, flow control agents, release agents and other conventional coating formulation agents. In addition, the compositions of the instant invention may contain certain acidic or basic materials to adjust the pH to the range of above about 7, preferably from about 8 to 10. Lower pH materials are less stable and often will gel prior to use. Preferably the compositions herein should be compounded employing pigment volume concentrations in the range of about 10 to about 60%.

The compositions of the instant invention should be added in the following weight ratios, the total being 100:

|  | Preferred | Most Preferred |
| --- | --- | --- |
| Acrylic resins | 2.5–58% (solids) | about 16% |
| Melamine resins | 0.3–17% (solids) | about 1.7% |
| Wax | 0.2–12% (solids) | about 2.5% |
| Platelet talc | 25–97% (solids) | about 80% |

EXAMPLE 1

An exterior, in-press primer was prepared by blending with mild agitation 119.95 parts of tap water, 35.02 parts of 3.3 percent aqueous hydroxyethyl cellulose, 7.47 parts of SMA 1440H dispersant, a styrenated dispersant available from Arco Chemical Company, 1.78 pounds of Tryton CF10, a nonionic polyethylene oxide-based surfactant, available from Rohm & Haas Company, 1.52 pounds of Hipower EK-18, an anionic dioctyl sulfosucsinate wetting agent available from High Point Chemical Co., 1.65 pounds of Nopco NXZ, a defoamer available from Diamond Shamrock Corp., and 21.2 pounds of Cymel 303, a hexamethoxymethyl melamine, available from the American Cyanamid Company.

Following blending under Cowles agitation, the following were sifted slowly into the above mixture: 155 pounds of a titanium dioxide pigment, available from the DuPont Corporation under the trade name of Typure R931, 55 pounds of a titanium dioxide available from the Benelite Corp. under the trade name of Hytox, 40 pounds of a talc compound as described hereafter, and 110.0 parts of Imsil A-10, a silica compound available from the Illinois Mineral Corporation. The platelet talc described above was manufactured by the Pfizer Corporation under the trade name of Microtalc MP12-50. It exhibited a maximum top particle size of 12 microns, an oil absorption percentage of 50, a specific gravity of 2.70, a Hegman finess of 6.0, and had the following chemical analysis:

| | |
|---|---|
| $SiO_2$ | 61.5% |
| MgO | 30.0% |
| CaO | 0.1% |
| $Al_2O_3$ | 2.2% |
| $Fe_2O_3$ | 0.7% |
| Acids solubles | 0.5% |
| Loss on ignition | 5.3% |
| Water solubles | 1.0% |

The resulting blend was dispersed to a grind fineness of 6NS and 158.27 parts of water, 387.20 parts of a 46.5% solids, styrene/methylmethacrylate, hydroxyl-containing polymeric emulsion, having a trade designation of Rhoplex 1822 and available from the Rohm & Haas Company, 8.69 parts of a 25% solids carnauba wax emulsion, available from Michelman Chemical Co., 0.93 parts of a Proxcel CRL fungicide, available from ICI America, Inc., were added, followed by 2.80 parts of tap water and 0.85 parts of dimethylamino ethanol. The pH of the resulting coating was 8.5-9.0, and the coating had a viscosity of 15-20 seconds on a #2 Zahn cup, a weight per gallon of 11.08 parts, and a weight solids content of 51.6 percent. The coating produced an excellent prepress finish, which eliminated the wax migration spotting after applying to Masonite boards prior to final finish.

EXAMPLES 2-4

Results similar to those of Example 1 were obtained when the Cymel 303 of Example 1 was replaced on a weight basis with (2) Cymel 373, a partially methylated methylol melamine resin available from the American Cyanamid Company, with (3) Uformite MM-83, a partially methylated methylol melamine available from the Reichold Chemical Co., and with (4) Cymel 1171, a glycoluril formaldehyde, hetrocyclic crosslinking agent available from the American Cyanamid Company.

EXAMPLES 5-7

Similar results were obtained when the Rhoplex 1822 was replaced on a weight basis with hydroxy functional acrylic latex resins available from the Union Carbide Corporation, having trade names of (5) UCAR Vehicle 4550 and (6) UCAR 4358 and with (7) Rhoplex TR 407, an internally crosslinking, acrylic emulsion available from the Rohm and Haas Company.

EXAMPLE 8

22.5 gallons of water were blended under mild agitation in a Cowles mixer with 1.90 pounds of SMA 1440, 7.5 gallons of hydroxyethyl cellulose, 0.27 gallons of Nopco NXZ, and 1.70 gallons of Cymel 303, all as described above in Example 1. After this blend was prepared, 85 pounds of platey talc and 375 pounds of Imsil A-10, were sifted slowly into the blend, and the resulting mixture was dispersed to 6 NS. Added to this mixture were 11.43 gallons of water and 34.33 gallons of the Rhoplex acrylic emulsion, followed by 0.83 gallons of carnauba wax dispersion and 0.1 gallon of Proxel CRL. After mixing, the resulting emulsion was adjusted to a pH of 8.5-9.0 using a mixture of 0.25 gallons of water and 0.25 gallons of dimethylethanol amine. The resulting coating composition had a #2 Zahn cup viscosity of 15 sec and a solids content of 54.8 percent. When applied to Masonite hardboard, excellent press release properties were obtained.

What is claimed is:

1. In a process for manufacturing composition boards under heat and pressure comprising providing a composition board stock, coating the surface of the stock, hot pressing the coated stock at elevated temperatures and pressure into a solid composition board product, and releasing the composition board product from the press, the improvement of which comprises utilizing as a composition board coating composition, an acrylic emulsion present at about the 2.5 to 58 percent by weight solids level, in combination with a platelet talc present at about the 25 to 97 percent by weight solids level, a crosslinking agent for the acrylic emulsion present at about the 0.3 to 18 percent by weight solids level, and a high melting wax present at about the 0.2 to 12 percent by weight solids level.

2. The process of claim 1 wherein the acrylic emulsion is present at about the 76 percent by weight solids level, the platelet talc is present at about the 80 percent by weight solids level, the crosslinking agent is present at about the 1.7 percent by weight solids level, and the high melting wax is present at about the 2.5 percent by weight solids level.

3. The process of claim 1 wherein the platelet talc contains talc particles having aspect ratios in the range of about 10:1 to about 30:1.

4. The process of claim 1 wherein the wax is a carnauba-based wax.

5. The process of claim 1 wherein the crosslinking agent is a melamine-based crosslinking agent.

6. The process of claim the melamine-based crosslinking agent is a polymethoxymethylol melamine.

7. The process of claim 1 wherein the pH of the coating composition is in the range of about 8 to about 10.

8. The process of claim 1 wherein the acrylic emulsion contains styrene and methylmethacrylate.

9. The process of claim 1 wherein the coating composition contains flow control agents and fillers.

* * * * *